US009031934B2

(12) United States Patent  
Yang et al.

(10) Patent No.: US 9,031,934 B2  
(45) Date of Patent: May 12, 2015

(54) ESTIMATION OF A FILTER FACTOR USED FOR ACCESS PATH OPTIMIZATION IN A DATABASE

(71) Applicant: International Business Machines Corporation, Armonk, NY (US)

(72) Inventors: Xin Ying Yang, Beijing (CN); Chun Guang Zeng, Beijing (CN); Xiang Zhou, Beijing (CN); Ke Wei Wei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/686,030

(22) Filed: Nov. 27, 2012

(65) Prior Publication Data

US 2013/0138630 A1   May 30, 2013

(30) Foreign Application Priority Data

Nov. 30, 2011   (CN) .......................... 2011 1 0391219

(51) Int. Cl.
   G06F 17/30         (2006.01)
(52) U.S. Cl.
   CPC ................ G06F 17/30442 (2013.01)
(58) Field of Classification Search
   CPC ................ G06F 17/30442; G06F 17/30466; G06F 17/30469
   See application file for complete search history.

(56) References Cited

U.S. PATENT DOCUMENTS 4,956,774 A * 9/1990 Shibamiya et al. .... 707/999.002  
5,091,852 A * 2/1992 Tsuchida et al. ....... 707/999.002  
6,006,220 A    12/1999 Haderle et al.  
6,219,660 B1    4/2001 Haderle et al.  
6,272,487 B1    8/2001 Beavin et al.  
7,080,062 B1    7/2006 Leung et al.

(Continued)

FOREIGN PATENT DOCUMENTS

EP         1548612 A1     6/2005

OTHER PUBLICATIONS

G. Antoshenkov, "Dynamic Query Optimization in Rdb/VMS," Proceedings of the Ninth International Conference on Data Engineering, pp. 538-547, Apr. 1993.
Richard L. Cole, et al., "Optimization of Dynamic Query Evaluation Plans," University of Colorado, pp. 1-28, Dec. 1993.

(Continued)

*Primary Examiner* — Khanh Pham  
(74) *Attorney, Agent, or Firm* — Cantor Colburn LLP; Jeanine Ray-Yartletts

(57) ABSTRACT

A computer program product and method for estimating a filter factor for access path optimization in a database are provided. The method includes extracting from a statement segment for database query a relation condition which defines the relationship between a variable and a first table. The method includes obtaining first statistics information according to the relation condition and the statistics information of the first table. The method includes extracting from the statement segment a filter condition which defines the relationship between the variable and a second table. The method includes obtaining second statistics information according to the filter condition and the statistics information of the second table, and according to the first statistics information and the second statistics information, estimating the filter factor of the filter condition. The method and computer program product according to the embodiments of the disclosure may more accurately estimate filter factor of the filter condition.

16 Claims, 5 Drawing Sheets

(56) References Cited

U.S. PATENT DOCUMENTS

| | | |
|---|---|---|
| 7,987,178 B2 | 7/2011 | Hueske et al. |
| 2004/0064441 A1 | 4/2004 | Tow |
| 2007/0220017 A1* | 9/2007 | Zuzarte et al. ............... 707/100 |
| 2010/0030728 A1* | 2/2010 | Chakkappen et al. ............ 707/2 |
| 2011/0060731 A1* | 3/2011 | Al-Omari et al. ............ 707/718 |

OTHER PUBLICATIONS

IBM, "Methods for optimizing queries involving input host variables or parameter markers using distribution statistics," Prior Art Database, 1 page, Jan. 2004.

Yannis E. Ioannidis, et al.,"Parametric Query Optimization," VLDB Journal , vol. 6.2, pp. 1-24 , 1997.

\* cited by examiner

| T5.C3 | FREQ |
|---|---|
| 'A' | 0.75 |
| 'B' | 0.15 |
| 'C' | 0.05 |
| 'D' | 0.03 |
| 'E' | 0.02 |

| T1.C2 | FREQ |
|---|---|
| 'B' | 0.40 |
| 'A' | 0.30 |
| 'F' | 0.05 |
| 'O' | 0.03 |
| 'Q' | 0.02 |
| ...... | |

ESTIMATION OF A FILTER FACTOR USED FOR ACCESS PATH OPTIMIZATION IN A DATABASE

PRIORITY

This application claims priority to Chinese Patent Application No. 201110391219.5, filed Nov. 30, 2011, and all the benefits accruing therefrom under 35 U.S.C. §119, the contents of which in its entirety are herein incorporated by reference.

BACKGROUND

The present disclosure relates to access path optimization in a database, and more particularly, to a method and apparatus for estimating a filter factor used for access path optimization in a database.

During the process of accessing a database and performing searching, in order to conduct a query, there is need for the database to establish an access plan. The access plan defines in what order tables are accessed, which indexes are used, and what joining method is used to link data. An access plan may be important for structured query language (SQL) statements to be rapidly executed. Most relational database management systems (RDMS) create access plans using a cost based optimizer. The cost based optimizer estimates the costs of each candidate access path according to the statistics information in the database, and selects the access path with the minimum cost as the optimal path. The above mentioned cost mainly comprises central processing unit (CPU) execution cost, input/output (I/O) cost, as well as other factors.

When calculating the costs of each candidate access path, the optimizer performs the estimation mainly according to the related statistics information of tables and indexes as well as filter factors of a query statement. A filter factor means, when "filtering" with a specified condition in a query statement, the ratio of data entries selected from a specified range of a database to the total data entries of the specified range. The filter factor may be important for the optimizer to create an effective access plan. In one example, assume that a database comprises a Sales Information Table T for a computer accessory consisting of 100 rows, in which 95 rows relate to Model A and 5 rows relate to Model B, and the model information is recorded in the 2nd column. If a query is conducted using the query statement SELECT*FROM T WHERE COLUMN_2='A', that is, filtering by using Model=A as the predicate, 95 data entries will be returned and the filter factor will be 95%. For such a filter condition and filter factor, the optimizer of the Database Management System can conclude from simple calculation that, it is an economic access path to directly scan and judge each row of Table T, and read the data entries where the $2^{nd}$ column is A. In another case, if filtering using Model=B as the predicate, 5 data entries will be returned and the filter factor will be 5%. In this case, the optimizer can conclude from calculation that, it is a preferable access path to first read the index of the table, and then directly access the data entries where the $2^{nd}$ column is B according to the pointer recorded in the index. Thus, it can be seen that the filter factor plays a relatively important role in the process of the optimizer creating an access plan.

In many cases, however, the filter factor cannot be obtained simply and directly like the above discussed example. For example, in the case of a typical embedded SQL, the SQL statement is embedded into a host application, and cites in the query statement the host variable(s) or parameter(s) of the host application. Hence, the precise selection of the filter condition and the value of the filter factor are directly dependent on the value of the host variable(s). However, as the variables in the host application, the values of the host variables can be determined only when the application is executed. Since there is no way to precisely determine the values of these variables in advance, the optimizer has to estimate a possible filter factor based on the assumption that the values of the host variables are evenly distributed, and perform the access path optimization based on the estimated filter factor. It could be understood that if the values of the host variables generated when the host application is executed deviate from the assumption of even distribution, the estimated filter factor will not be precise enough, thus obtaining an access plan with low efficiency.

In order to solve the problem, in some solutions, during the process of executing the host application, the access path will be optimized once again by using the actually generated values of the host variables. However, the cost caused by the re-optimization in the process of execution may sometimes be unacceptable, or may affect the execution performance of the application. Therefore, in most cases, the access path for an SQL statement is still created statically before the runtime, instead of being optimized dynamically.

SUMMARY

A method and a computer program product for estimating a filter factor used for access path optimization in a database is provided. The method and computer program product according to the embodiments of the disclosure may more accurately estimate the filter factor of the filter condition.

DETAILED DESCRIPTION

Figure 1:
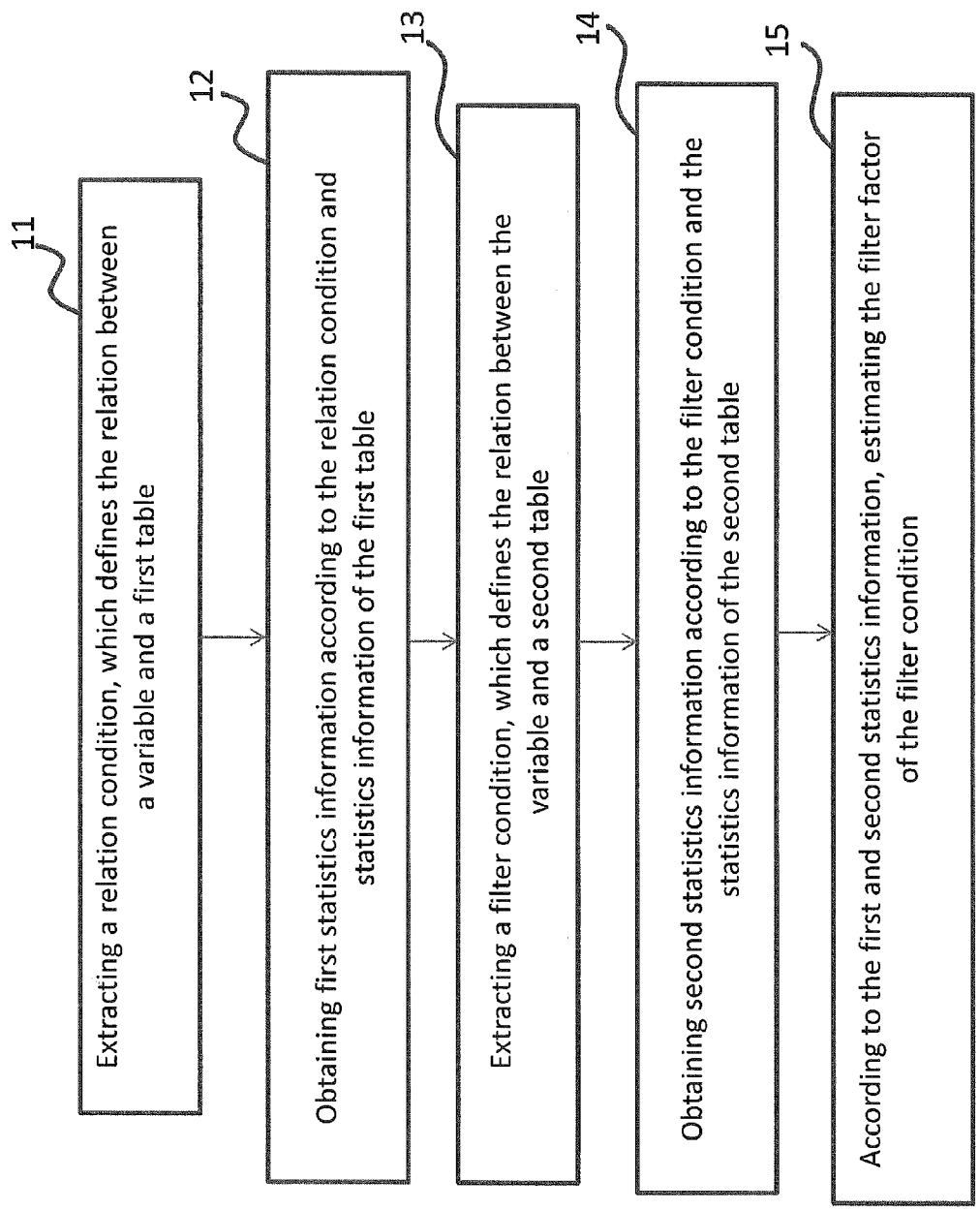
FIG. 1 illustrates a flow chart showing a method for estimating filter factor according to an embodiment of the present disclosure.

Embodiments of the present disclosure are described in the following. Embodiments include systems, methods and computer program products. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments include a computer program product embodied in one or more computer readable medium having computer usable program code embodied in the medium.

Any combination of one or more computer readable medium may be utilized. The computer readable medium may be computer-readable signal medium or computer-readable storage medium. The computer-readable storage medium may be, for example but not limited to, an electronic, magnetic, optical, electromagnetic, infrared, or semiconductor system, apparatus, device or any combinations thereof. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device or any proper combinations thereof. In the context of this document, a computer-readable storage medium may be any tangible medium that can contain, or store the program for use by or in connection with the instruction execution system, apparatus, or device.

Computer readable signal medium may include a propagated data signal with the computer-readable program code embodied therewith, either in baseband or as part of a carrier wave. Such propagated signal may use any proper form, including but not limited to, electromagnetic signal, optical signal, or any proper combination thereof. Computer readable signal medium may be any computer readable medium that is different from computer-readable storage medium and can communicate, propagate, or transport the program for use by or in connection with the instruction execution system, apparatus, or device.

Program code included in the computer readable medium may be transmitted using any appropriate medium, including but not limited to wireless, wireline, optical fiber cable, radio frequency (RF), etc. or any proper combination thereof.

Computer program code for carrying out operations of the present disclosure may be written in any combination of one or more programming languages, including an object oriented programming language such as Java, Smalltalk, C++ or the like and conventional procedural programming languages, such as "C" programming language or similar programming languages. The program code may execute entirely on a user computer, partly on a user computer, as a stand-alone software package, partly on user computer and partly on a remote computer or entirely on a remote computer or server. In the latter scheme, the remote computer may be connected to the user computer through any type of network, including a local area network (LAN) or a wide area network (WAN), or the connection may be made to an external computer (for example, through the Internet using an Internet Service Provider).

Below, aspects of the disclosure will be described with reference to flowchart and/or block diagram of methods, apparatuses (systems) and computer program products of the embodiment of the disclosure. Note that, each block of the flowchart and/or block diagram, and combinations of blocks in the flowchart and/or block diagram, can be implemented by computer program instructions. These computer program instructions may be provided to a processor of a general-purpose computer, a special-purpose computer or other programmable data processing apparatus to produce a machine, such that the instructions which execute on the computer or other programmable data processing apparatus create means for implementing the functions/actions specified in the block(s) of the flowchart and/or block diagram.

These computer program instructions may also be stored in a computer-readable medium that can direct a computer or other programmable data processing apparatus to function in a particular manner, such that the instructions stored in the computer-readable medium produce an article of manufacture including instruction means which implement the functions/actions specified in the block(s) of the flowchart and/or block diagram.

The computer program instructions may also be loaded into a computer or other programmable data processing apparatus to perform a series of operational blocks on the computer or other programmable data processing apparatus so as to produce computer implemented process, such that the instructions which execute on the computer or other programmable data processing apparatus will provide process for implementing the functions/actions specified in the block(s) of the flowchart and/or block diagram.

Next, the embodiments of the disclosure will be described in conjunction with the drawings. It should be appreciated that the description of the following detailed examples are merely to explain the exemplary implementing modes, rather than to impose any limitation on scope of the disclosure.

In many embodiments of the disclosure, the estimating method considers the context of the database query statement, digs out the relationship between tables linked each other by variables in database, and estimates filter factor of a filter condition based on such relationship, thereby providing a better foundation for access path optimization.

In view of the above discussion, the present disclosure may improve estimation the filter factor of the filter condition in a database query, thereby facilitating the optimization of the access path.

The method and apparatus according to the embodiments of the disclosure may make the statically estimated filter factor closer to the actual filtering result, thereby providing a better foundation for access path optimization in database, and making the created access plan more effective.

FIG. 1 is a flow chart illustrating a method for estimating a filter factor according to one embodiment of the disclosure. The method is used for estimating a filter factor of filter condition in a database query statement for subsequent optimization of access path. As shown in FIG. 1, the method includes blocks 11, 12, 13, 14 and 15. Block 11 includes extracting a relation condition from a statement segment for the database query. The relation condition defines the relationship between a variable and a first table. Block 12 includes obtaining first statistics information according to the relation condition and the statistics information of the first table. The first statistics information comprises first data value information relating to the possible values of the variable under the relation condition, and first probability information relating to the occurrence probability of the data values in the first data value information. Block 13 includes extracting a filter condition from the statement segment. The filter condition defines the relationship between the variable and a second table. Block 14 includes obtaining second statistics information according to the filter condition and the statistics information of the second table. The second statistics information comprises second data value information relating to the possible values of the variable under the filter condition, and second probability information relating to the occurrence probability of the data values in the second data value information. Block 15 includes estimating, according to the first statistics information and the second statistics information, the filter factor of the filter condition for access path optimization in the database query relating to the filter condition.

Next, the implementing mode of the above blocks will be described in conjunction with detailed examples.

In particular, the following is a piece of code of a statement segment for the database query. The code is written in SQL language, and is embedded into an application as indicated by the tag EXEC SQL. In order to highlight the analysis to SQL statement, other detailed content of the application is omitted here.

---

EXEC SQL DECLARE CUR CURSOR FOR SELECT COL3 FROM
TB5;      (1)
......
    EXEC SQL FETCH FROM CUR INTO :HV1;      (2)
......
    EXEC SQL DECLARE CUR1 CURSOR FOR SELECT
T1.COL3, T2.COL1, T3.COL2
    FROM TB1,TB2,TB3
    WHERE TB1.COL1=TB2.COL1 AND TB1.COL2=:HV1 AND
    TB2.COL4=:HV2
    AND TB2.COL2=TB3.COL2 AND TB3.COL3=:HV3 AND
    EXISTS(SELECT 1 FROM TB4
        WHERE TB4.COL2 = TB2.COL6 AND TB4.COL1='MA2100'
AND TB4.COL7=:HV4;)
......

---

As to the above code, those skilled in the art can understand that the SQL statement segment cites several variables HV1-HV4, and the variable HV1 is associated with table TB5 and table TB1 simultaneously. In particular, in statement (1) a cursor CUR is declared, which scans the $3^{rd}$ column COL3 of the table TB5. Subsequently, in statement (2), the values scanned by the cursor CUR are given to the variable HV1. In the following query statement, a plurality of filter conditions are defined with "Where", including the condition TB1.COL2=:HV1. The condition means to filter the data with a value equal to that of HV1 from the $2^{nd}$ column COL2 of the table TB1.

In the prior art, as HV1 is a variable whose value is unknown, therefore for the filter condition TB1.COL2=: HV1, suppose that HV1 has an even probability of being given the different values in COL2. However, according to the embodiments of the disclosure, by analyzing the context of the query statement, the relationship between TB5 and TB1 may be dug out, which are linked by HV1, thereby estimating the filter factor of the above mentioned filter condition. That is, the filter factor can be better estimated by performing the blocks of the method as shown in FIG. 1 for the above statement segment.

In particular, according to block 11 of FIG. 1, the process extracts a relation condition from the statement segment cited above. The relation condition defines the relationship between a variable and a first table. In this example, the relation condition may come from the assignment statements (1) and (2) in the above statement segment, which statements define the relationship between the variable HV1 and the first table TB5, that is, the data values in the $3^{rd}$ column COL3 of TB5 scanned by the cursor are given to the variable HV1, or in other words, HV1 has the data values stored in the $3^{rd}$ column COL3 of TB5. The relation condition may be simply expressed as HV1=TB5.COL3.

It can be understood that the relation condition is a generic name, and as long as a statement involves description and definition to the association between items in database, such as tables, data, variables, etc., it can be deemed to provide a relation condition. The block of extracting relation condition may be realized by scanning statement segment, and recognizing key words defining associations. Such key words include assignment-concerning words SELECT INTO, FETCH INTO, relation-defining symbol "=", and the like.

Subsequently, in block 12, according to the relation condition HV1=TB5.COL3 and the statistics information of the first table TB5, the process obtains the distribution information of the variable values, also referred to as the first statistics information herein, which comprises a first data value information relating to the possible values of the variable HV1 under the above relation condition, and a first probability information relating to the occurrence probability of the data values in the first data value information. In particular, according to the definition of the relation condition, the variable HV1 has the data values in COL3 of TB5. At the same time, the statistics information concerning TB5 is stored in the database. Hence, according to the statistics information, the distribution of the values of HV1 may be obtained. More particularly, it can be known from the statistics information of database which data values are stored in COL3 of TB5 (corresponding to HV1), and what is the occurrence frequency or probability of each value. For example, it may be supposed that in COL3 there stores n possible data values $V_1, V_2, \ldots V_n$, expressed by the data value set $V=(V_1, V_2, \ldots, V_n)$. In addition, the distribution of the n data values is that, the occurrence frequency of $V_1$ in COL3 is $F_1$, the frequency of $V_2$ is $F_2$, and so on, expressed as the frequency set $F=(F_1, F_2, \ldots, F_n)$. Such statistics information is generally stored in database in advance, or may be obtained by simple calculation based on basic statistics information. Based on the relationship between HV1 and the first table TB5 as defined in the assignment statement, the data value set V may be regarded relating to TB5 as the first data value information, and the frequency set F as the first probability information.

In the above example, all possible values in COL3 are given to HV1, and therefore the sum of the occurrence frequencies of all possible values is equal to the number of total data items in COL3, and in this case, the absolute occurrence frequency $F_i$ of the data value V, is equal to its occurrence probability. However, this is not necessary. In other examples, the assignment of the variable may be defined by various relation conditions. For example, the assignment of the variable can be defined in the assignment statement that the data values unequal to $V_q$ in COL3 of TB5 are given to HV1. Thus, the first data value information can be obtained after excluding $V_q$ from the above mentioned data set V. In this case, the frequency value $F_i$ of the data value $V_i$ only reflects the occurrence frequency of $V_i$ in COL3, which is not equal to the occurrence probability that HV1 has value of $V_i$. In order to reflect the occurrence probability of $V_i$ among all possible values of HV1, the relative proportion of the occurrence frequency of each possible value may be considered. To this end, a weighting factor $w_i$ may be defined as:

$$w_i = \frac{F_i}{\sum_i F_i}$$

Therefore, the set of the above weighting factors $w=(w_1, w_2, \ldots, w_n)$ may be regarded as the above mentioned first probability information.

In the above examples, the distribution of the variable values is described as sets, i.e., the data value set and the probability set. It can be understood, however, in other examples, the data value information and the probability information may be expressed in other formats. For instance, in an example, the distribution of the variable values may be expressed in the form of vectors. For example, data value vectors are used to indicate the possible values of the variable, and probability vectors are used to indicate the occurrence probabilities of the possible values. In additional examples, more expression formats may be used, such as array, matrix, polynomial, etc.

Subsequently, according to block 13 of FIG. 1, the process extracts a filter condition from the above statement segment, wherein the filter condition defines the relationship between the above variable and a second table. It can be understood that the extraction of the filter condition in this block may be realized in a similar way to that in the above block 11. In this example, in the query statement starting with Where, a plurality of filter conditions are defined including the condition TB1.COL2=:HV1, which defines a relationship between the variable HV1 involved in the above relation condition and another table TB1 (i.e., the second table). In particular, the filter condition aims to filter from the $2^{nd}$ column COL2 of the second table TB1 the data items equal to the value of HV1.

Subsequently, in block 14, similarly to block 12, second statistics information may be obtained according to the above filter condition and the statistics information of the second table TB1. The second statistics information comprises second data value information relating to the possible values of the variable HV1 under the above filter condition, and a second probability information relating to the occurrence probability of the data values in the second data value information.

In particular, it may firstly obtain the information relating to the variable HV1 from the statistics information of the second table. For example, suppose that in COL2 of TB1, m possible data values $v_1, v_2, \ldots, v_m$ are stored, expressed as the data value set $v=(v_1, v_2, \ldots, v_m)$. In addition, the distribution of the m data values is that the occurrence frequency of $v_1$ in COL2 is $f_1$, the occurrence frequency of $v_2$ is $f_2$, and so on, expressed as the frequency set $f=(f_1, f_2, \ldots, f_m)$. According to the filter condition TB1.COL2=:HV1, the data value set $v = (v_1, v_2, \ldots, v_m)$ in the above statistics information may be regarded as the second data value information, for the set indicates the possible values of HV1 under the above filter condition; the frequency set $f=(f_1, f_2, \ldots, f_m)$ may be regarded as the second probability information, for it relates to the occurrence probability of the data values in the set v. Thus, it may obtain the second statistics information relating to the second table and HV1.

Thus, the method of FIG. 1 obtains the first statistics information in block 12, and obtains the second statistics information in block 14. The first statistics information indicates the possible values of the variable HV1 and their distribution under the relation condition extracted in block 11, and the second statistics information indicates the possible values of the variable HV1 and their distribution under the filter condition extracted in block 13. As the same variable HV1 should satisfy both the filter condition and the relation condition simultaneously, the filter factor of the filter condition should be considered in combination with both the first statistics information and second statistics information. That is, as shown in block 15 of FIG. 1, according to both the first statistics information and the second statistics information, the filter factor of the filter condition is estimated for access path optimization.

Figure 2:
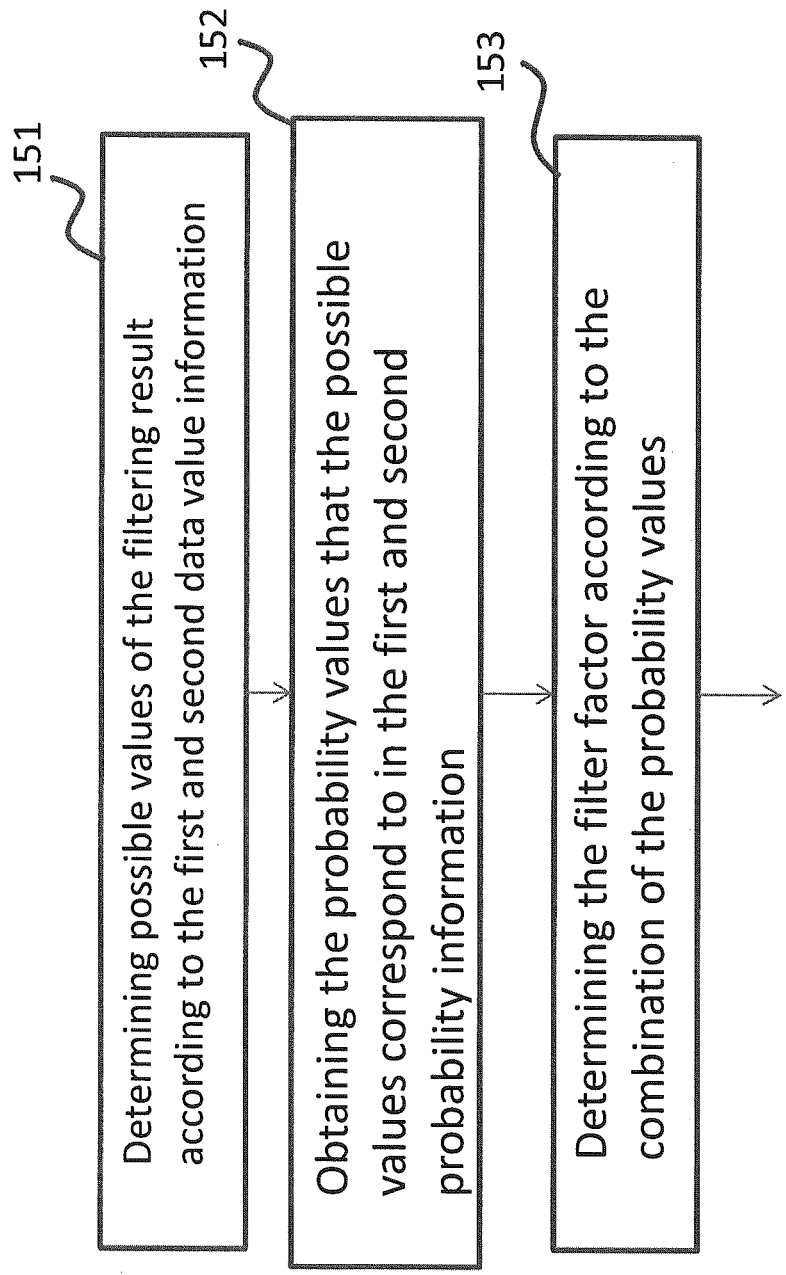
FIG. 2 illustrates subblocks of block 15 in FIG. 1 according to an embodiment of the present disclosure.

FIG. 2 shows subblocks of block 15 in FIG. 1 according to one embodiment of the disclosure. As shown in FIG. 2, the above block 15 may subblocks 151, 152, and 153. The subblock 151 determines possible values of the filtering result according to the first data value information of the first statistics information and the second data value information of the second statistics information. The subblock 152 obtains the probability values of the possible values of the filtering result in the first probability information and the second probability information, respectively. The subblock 153 determines the filter factor of the filter condition according to the combination of the probability values.

The subblocks of FIG. 2 will be described still in conjunction with the above example of the SQL statement. In the example, the first statistics information for HV1 comprises the first data value information $V=\{V_1, V_2, \ldots, V_n\}$ and the first probability information $w=(w_1, w_2, \ldots, w_n)$, and the second statistics information comprises the second data value information $v=(v_1, v_2, \ldots, v_m)$ and the second probability information $f=(f_1, f_2, \ldots, f_m)$.

Based on the above statistics information, in block 151, the process determines possible values of the filtering result by using the first data value information V and the second data value information v. The possible values of the filtering result may be determined as $FV=(FV_1, FV_2, \ldots, FV_k)$, where any element $FV_j$ in the k elements belongs to the first data value information V and/or the second data value information v.

Next, in block 152, the process obtains the corresponding probability values for the filtering result possible values FV from the first probability information w and the second probability information f, respectively. Supposed that the filtering result value $FV_j$ corresponds to the probability value $Fw_j$ in the first probability information, it can be found that the first filter probability corresponding to FV is $Fw=(Fw_1, Fw_2, \ldots, Fw_k)$. It can be understood that, if the possible value $FV_j$ of the filtering result is not included in the first data value information V, the corresponding probability value for $FV_j$ in the first probability information is 0, that is, $Fw_j=0$. Similarly, the corresponding probability value for any possible value $FV_j$ of the filtering result in the second probability information can be found, thus forming the second filter probability $Ff=(Ff_1, Ff_2, \ldots, Ff_k)$.

Then, based on the combination of the probabilities obtained above, that is, the combination of the first filter probability and the second filter probability, the filter factor of the filter condition is determined. In particular, the filter factor may be determined as the sum of the products of the corresponding probability values in the first filter probability and the second filter probability. If the first filter probability Fw and the second filter probability Ff are expressed in the format of vectors, the filter factor may be expressed as the dot product of the two vectors:

$$FF = Fw \cdot Ff = \sum_{j=1}^{k} Fw_j^{(1)} \times Ff_j$$

Figures 3, 4:
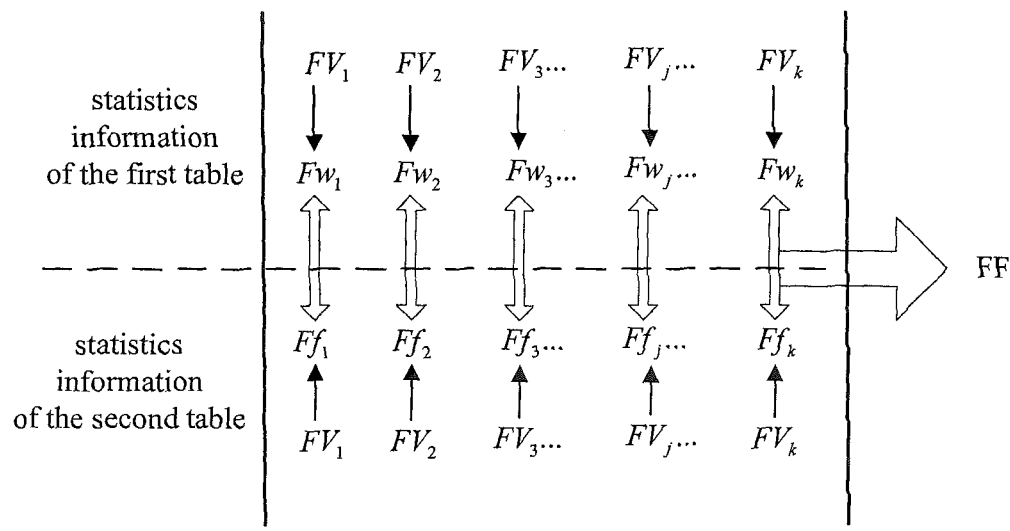
FIG. 3 illustrates an example of a filter matrix.
FIG. 4 illustrates an example of the statistics information of a database table.

The above process for determining the filter factor may be shown by the filter matrix in FIG. 3. As shown in FIG. 3, the filter matrix is divided into the upper part and the lower part by a dashed line. The upper part relates to the statistics information of the first table, and the lower part relates to the statistics information of the second table. The first row of the upper part shows the possible values of the filtering result: $FV_1, FV_2, \ldots, FV_k$; the second row shows the corresponding values for each possible value $FV_j$ in the probability information of the first table: $Fw_1, Fw_2, Fw_k$. In the lower part, the last row shows likewise the possible values of the filtering result, and correspondingly on top of them are the corresponding values for these possible values $FV_j$ in the probability information of the second table: $Ff_1, Ff_2, \ldots, Ff_k$. The same possible value $FV_j$ of the filtering result has two probability values $Fw_j$ and $Ff_j$, which correspond one-to-one on both sides of the matrix dashed line. The one-to-one corresponding probability values may be combined, and thus obtain the final filter factor.

In the process of determining the possible values of the filtering result as described above, it can be understood that, as the filtering result must allow HV1 to satisfy both the relation condition and the filter condition simultaneously. In one embodiment, the possible values of the filtering result may be determined as the intersection of the first data value information V and the second data value information v. That is, allowing any element $FV_j$ in FV to belong to both sets V and v simultaneously.

However, in order to make the computing process easier, in another embodiment, all the data values in the first data value information V and the second data value information v may be directly put into the set of possible values of the filtering result. That is, allowing any element in FV to belong to at least one of the set V and the set v. In this case, there may be some elements that only belong to one of the two data value information, for example, $FV_p$ only belongs to the first data value information V, and does not belong to v. As $FV_p$ does not belong to v, therefore, this possible value of the filtering result corresponds to the probability value 0 in the second probability information. Thus, when calculating the probability value combination Fw*Ff, the result of the item corresponding to this data value is 0, and thus the final result is the same as the above discussed embodiment.

In one embodiment, the number of the data items may be adjusted, and calculated according to the requirement of calculation accuracy. To this end, in one embodiment, in the process of determining possible values of the filtering result, only a predetermined part of the data values in the intersection of the first data value information and the second data value information is regarded as the possible values of the filtering result. The range of the above mentioned predetermined part may be defined in advance by many ways. For example, in one embodiment, after determining the intersection of the first data value set V and the second data value set v, only a predetermined number of data values with the largest occurrence probabilities in the intersection are selected as the basis for further calculation. In another example, only the data values whose occurrence probabilities in the intersection exceed a predetermined threshold are selected as the possible values of the filtering result. The above mentioned occurrence probabilities may be prescribed in advance as the probability values in the first probability information or in the second probability information. It can be understood that, according to the desired calculation accuracy, the range of the above mentioned predetermined part may be defined by other ways.

Next, the above process of estimating filter factor will be described in conjunction with a more detailed example of tables. FIG. 4 shows an example of the statistics information of a database table. In this example, suppose that the first statistics information as shown in the left part of FIG. 4 may be obtained according to the relation condition described above and the statistics information of the first table TB5, and the second statistics information as shown in the right part of FIG. 4 may be obtained according to the filter condition and the statistics information of the second table TB1. In particular, the first statistics information shows that 5 data items are stored in COL3 of TB5 and may possibly serve as the values of the variable HV1, being A-E, respectively, whose occurrence probabilities are shown in the FREQ column. Thus, the first data value information comprises V=(A, B, C, D, E), and the first probability information comprises w=(0.75, 0.15, 0.05, 0.03, 0.02). The second statistics information shows that 50 data items are stored in COL2 of TB1 and may possibly serve as the values of the variable HV1, whose occurrence probabilities are shown in the FREQ column. Thus, the second data value information comprises v=(B, A, F, O, Q, . . . ), and the second probability information comprises f=(0.40, 0.30, 0.05, 0.03, 0.02, . . . ). In one embodiment, in block 151, the intersection of V and v is obtained as the possible values of the filtering result, and thus FV=(A, B). In block 152, the corresponding probability values for the possible values of the filtering result in the first probability information and the second probability information are found, respectively, thus obtaining the first filter probability Fw=(0.75, 0.15) and the second filter probability Ff=(0.30, 0.40). Therefore, in block 153, a combinational calculation on Fw and Ff may be performed according to the formula (1), thus obtaining the filter factor FF=Fw*Ff=0.75×0.30+0.15×0.40=0.29.

It can be understood that, in the prior art, when analyzing the filter condition TB1.COL2=HV1, as the values of HV1 are uncertain, therefore, it has to be supposed that HV1 evenly has the probabilities of being equal to all the values in COL2 of TB1. Here, since 50 different values are stored in COL2, according to the prior art, the filter factor FF will be equal to 0.02. However, based on the method of estimation according to the embodiment of the disclosure, the resultant FF is 0.29, which is much different from the result of the prior art. In addition, as the estimating process according to the embodiment of the disclosure considers the distribution of the variable values, the obtained filter factor can approximate to the actual filtering result to a greater extent, thus significantly improving the result of subsequent access path optimization. In addition, as the filter factor is estimated in advance before the host application is executed, the method of the above embodiments can obtain accurate filter factors in the case of static estimation without influencing the performance of execution.

In the above embodiments, the process of estimating the filter factor is described in terms of one filter condition. In the above exemplary SQL code, in the statement starting with Where, a plurality of filter conditions are defined, such as TB2.COL4=HV2, etc. In one embodiment, the above estimating process may be performed for each of the filter conditions comprised in the query statement, thus obtaining the filter factor of each filter condition. Then, all the filter factors are combined according to the logical relations (for example, AND) defined by the query statement, thus estimating the filter profile of the entire query statement. It can be understood that such process is also comprised in the scope of the disclosure.

From the above discussion, the embodiments of the disclosure consider the context of the database query statement, obtain the relationship between tables linked each other by a variable, and thus estimate the associated filter factor, thereby providing a better foundation for access path optimization.

Figure 5:
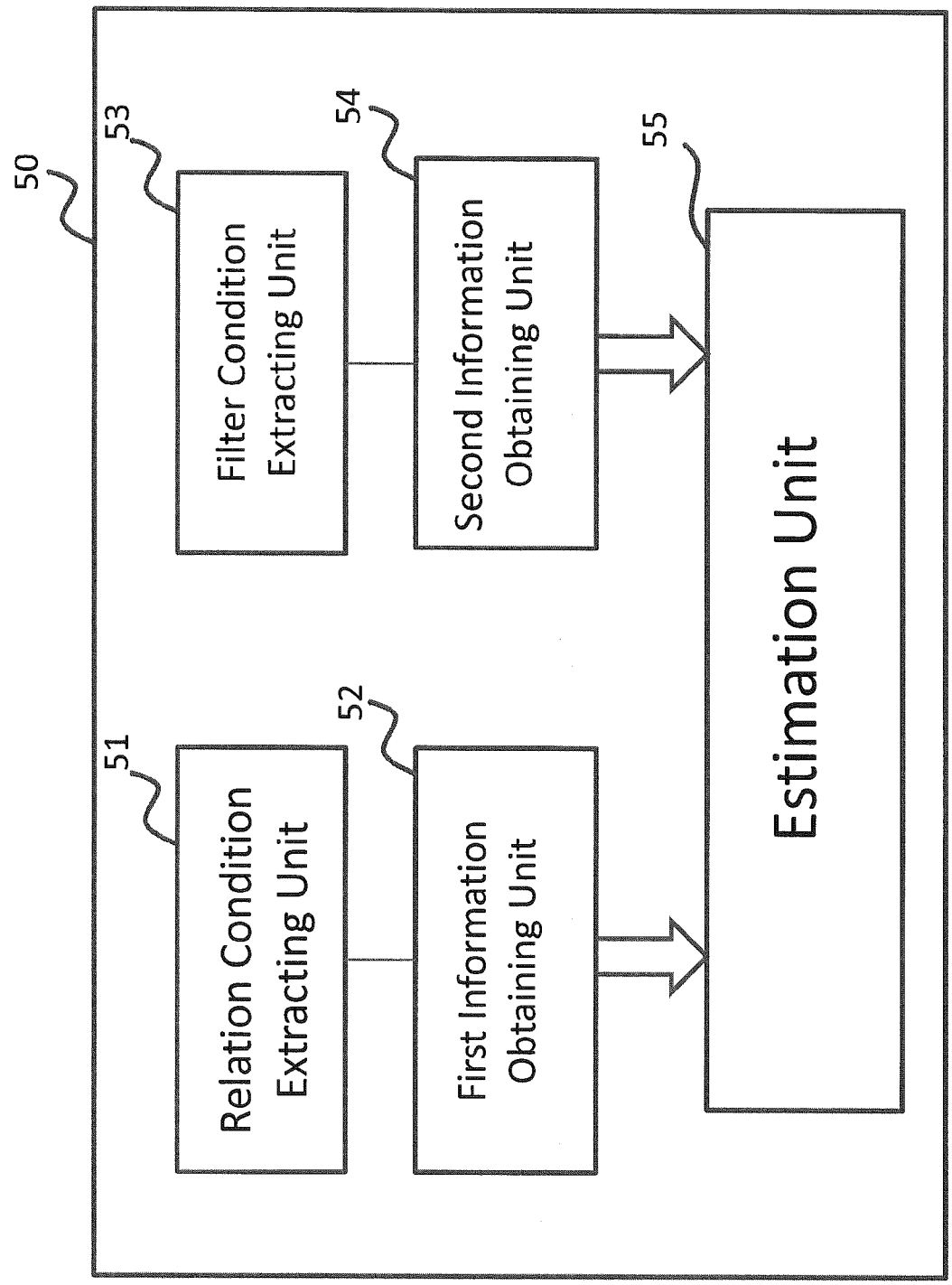
FIG. 5 illustrates an apparatus for estimating the filter factor according to an embodiment of the present disclosure.

Based on the same concept, the embodiments of the disclosure further provides an apparatus for estimating filter factor used for access path optimization. FIG. 5 shows an apparatus for estimating filter factor according to one embodiment of the disclosure. As shown in the FIG. 5, the apparatus for estimating filter factor is on the whole labeled as 50. The apparatus 50 includes a relation condition extraction unit 51, a first information obtaining unit 52, a filter condition extracting unit 53, a second information obtaining unit 54, and an estimation unit 55. The relation condition extracting unit 51 is configured to extract a relation condition from a statement segment for database query. The relation condition defines the relationship between a variable and a first table. The first information obtaining unit 52 is configured to obtain first statistics information according to the relation condition and the statistics information of the first table. The first statistics information comprises first data value information relating to the possible values of the variable under the relation condition, and first probability information relating to the occurrence probability of the data values in the first data value information. The filter condition extracting unit 53 is configured to extract a filter condition from the statement segment. The filter condition defines the relationship between the variable and a second table. The second information obtaining unit 54 is configured to obtain second statistics information according to the filter condition and the statistics information of the second table. The second statistics information comprises second data value information relating to the possible values of the variable under the filter condition, and second probability information relating to the occurrence probability of the data values in the second data value information. The estimation unit 55 is configured to estimate, according to the first statistics information and the second statistics information, the filter factor of the filter condition for access path optimization in the database query relating to the filter condition. In the apparatus, the first information obtaining unit 52 is linked to the relation condition extracting unit 51, the second information obtaining unit 54 is linked to the filter condition extracting unit 53, and both the first information obtaining unit 52 and the second information obtaining unit 54 transmit the obtained statistics information to the estimation unit 55.

In one embodiment, the estimation unit 55 further comprises subunits or modules to realize the estimation of filter factor (not shown). In particular, the estimation unit 55 may comprise a possible value obtaining module configured to obtain the possible values of the filtering result according to the first data value information in the first statistics information and the second data value information in the second statistics information. The estimation module 55 may include a probability value obtaining module configured to obtain the corresponding probability values for the possible values of the filtering result in the first probability information and the second probability information, respectively. The estimation unit 55 may include a determination module configured to determine filter factor of the filter condition according to the combination of the probability values.

In one embodiment, the apparatus 50 of FIG. 5 further comprises a combination unit (not shown), configured to estimate the filter factor of each of two or more filter conditions in the query statement, and combine the estimated filter factors according to the logical relation defined in the query statement in order to obtain the filter factor of the query statement.

The detailed implementing modes of the above mentioned units or modules will be omitted for reference can be made to the detailed description in conjunction with the method process and detailed examples hereinbefore.

It can be understood that the above apparatus 50 for estimating filter factor may be embedded into or attached to the optimizer of an existing database system as expansion of functions. Or alternatively, the apparatus 50 may analyze and estimate filter factor of the filter condition as an independent tool, and provide the estimated filter factor as the basis for access path optimization.

Figure 6:
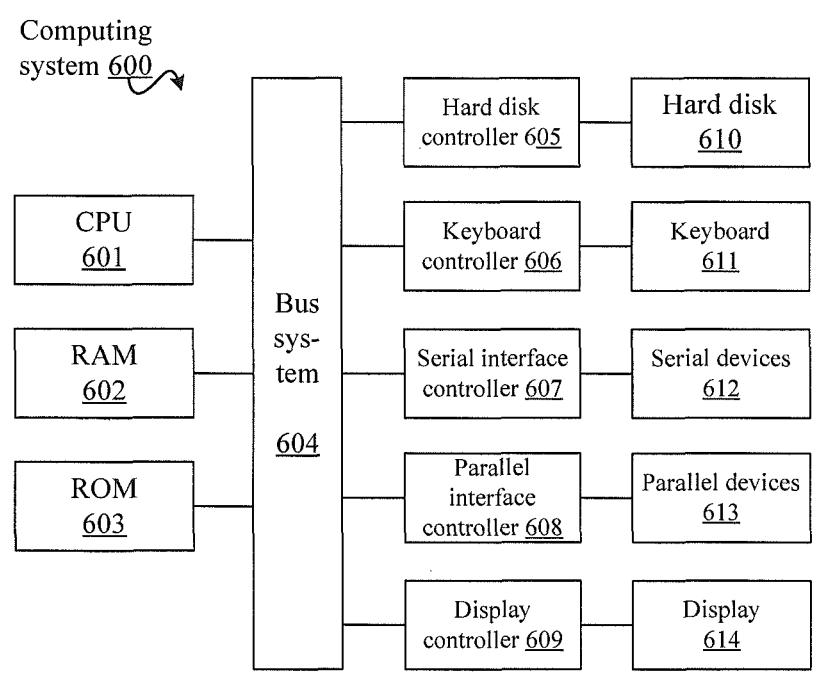
FIG. 6 is a block diagram showing a computing system for implementing embodiments of the present disclosure.

The method and apparatus for estimating filter factor as described above may be realized by using a computing system. FIG. 6 is a block diagram showing an exemplary computing system 600 suitable to implement the embodiments of the disclosure. As shown, the computer system 600 may comprise: a CPU (Central Processing Unit) 601, a RAM (Random Access Memory) 602, a ROM (Read-Only Memory) 603, a system bus 604, a hard disk controller 605, a keyboard controller 606, a serial interface controller 607, a parallel interface controller 608, a display controller 609, a hard disk 610, a keyboard 611, a serial external device 612, a parallel external device 613 and a display 614. Among these devices, the system bus 604 couples to the CPU 601, the RAM 602, the ROM 603, the hard disk controller 605, the keyboard controller 606, the serial controller 607, the parallel controller 608 and the display controller 609. The hard disk is coupled to the hard disk controller 605, the keyboard 611 is coupled to the keyboard controller 606, the serial external device 612 is coupled to the serial interface controller 607, the parallel external device 613 is coupled to the parallel interface controller 608, and the display 614 is coupled to the display controller 609. It is appreciated that, the structural block diagram shown in FIG. 6 is merely for purpose of illustration, rather than being a limitation to the scope of the disclosure. In some circumstances, certain devices may be added or removed based on actual condition.

The flowcharts and block diagrams in the accompany drawing illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although respective apparatus and method of the present disclosure have been described in detail in conjunction with specific embodiments, the present disclosure is not limited thereto. Under teaching of the specification, various changes, replacements and modifications may be made to the disclosure by those skilled in the art without departing from the spirit and scope of the disclosure. It is appreciated that, all such changes, replacements and modifications still fall within the protection scope of the disclosure. The scope of the disclosure is defined by the appended claims.

What is claimed is:

1. A method for estimating a filter factor for access path optimization in a database, comprising:
   extracting from a statement segment for database query a relation condition which defines a relationship between a variable and a first table;
   obtaining a first statistics information according to the relation condition and statistics information of the first table, wherein the first statistics information comprises first data value information relating to possible values of the variable under the relation condition, and a first probability information relating to an occurrence probability of data values in the first data value information;
   extracting from the statement segment a filter condition which defines a relationship between the variable and a second table;
   obtaining a second statistics information according to the filter condition and statistics information of the second table, wherein the second statistics information comprises second data value information relating to the possible values of the variable under the filter condition, and a second probability information relating to an occurrence probability of the data values in the second data value information; and according to the first statistics information and the second statistics information, estimating the filter factor of the filter condition for access path optimization in the database query relating to the filter condition, said estimating including:

determining possible values of a filtering result, the determining including:

taking a predetermined part of the data values in an intersection of the first data value information and the second data value information as the possible values of the filtering result, wherein the predetermined part is selected in one of the following ways: selecting a predetermined number of data values with the largest occurrence probabilities in the intersection, and selecting the data values whose occurrence probabilities in the intersection exceed a predetermined threshold.

2. The method according to claim 1, wherein the at least one of first statistics information and the second statistics information is expressed in at least one of the following forms: set, vector, matrix, polynomial and array.

3. The method according to claim 1, wherein said obtaining the first statistics information comprises: obtaining the values corresponding to the variable as the first data value information from the statistics information of the first table according to the relationship between the variable and the first table, and obtaining occurrence frequencies of the values corresponding to the variable as the first probability information.

4. The method according to claim 1, wherein said obtaining the first statistics information comprises: obtaining the values corresponding to the variable as the first data value information from the statistics information of the first table according to the relationship between the variable and the first table, and obtaining the relative ratios of occurrence frequencies of the values corresponding to the variable as the first probability information.

5. The method according to claim 1, wherein said estimating further includes:

obtaining corresponding probability values for the possible values of the filtering result from the first probability information and the second probability information, respectively; and determining the filter factor according to the combination of the probability values.

6. The method according to claim 5, wherein said determining the filter factor comprises: estimating the filter factor FF as:

$$FF = \sum_{j=1}^{k} Fw_j \times Ff_j,$$

where $Fw_j$ and $Ff^j$ are the corresponding probability values for the $j^{th}$ possible value of the filtering result in the first probability information and the second probability information, respectively.

7. The method according to claim 5, wherein said determining possible values of the filtering result further includes taking the data values in an intersection of the first data value information and the second data value information as the possible values of the filtering result.

8. The method according to claim 1, further comprising: estimating the filter factor of each of two or more filter conditions in a query statement, and combining estimated filter factors according to a logical relation defined in the query statement in order to obtain the filter factor of the query statement.

9. A computer program product for implementing a filter factor for access path optimization in a database, the computer program product comprising:

a non-transitory storage medium readable by a processing circuit and storing instructions for execution by the processing circuit for performing a method comprising:

extracting, by a relation condition extracting unit, from a statement segment for database query a relation condition which defines a relationship between a variable and a first table;

obtaining, by a first information obtaining unit, a first statistics information according to the relation condition and statistics information of the first table, wherein the first statistics information comprises first data value information relating to the possible values of the variable under the relation condition, and a first probability information relating to an occurrence probability of data values in the first data value information;

extracting, by a filter condition extracting unit, from the statement segment a filter condition which defines a relationship between the variable and a second table;

obtaining, by a second information obtaining unit, a second statistics information according to the filter condition and statistics information of the second table, wherein the second statistics information comprises second data value information relating to the possible values of the variable under the filter condition, and a second probability information relating to an occurrence probability of the data values in the second data value information; and estimating, by an estimation unit, according to the first statistics information and the second statistics information, the filter factor of the filter condition for access path optimization in the database query relating to the filter condition, said estimating including:

determining possible values of a filtering result, the determining including:

taking a predetermined part of the data values in an intersection of the first data value information and the second data value information as the possible values of the filtering result, wherein the predetermined part is selected in one of the following ways: selecting a predetermined number of data values with the largest occurrence probabilities in the intersection, and selecting the data values whose occurrence probabilities in the intersection exceed a predetermined threshold.

10. The computer program product according to claim 9, wherein at least one of the first statistics information and the second statistics information is expressed in at least one of the following forms: set, vector, matrix, polynomial, and array.

11. The computer program product according to claim 9, wherein the first information obtaining unit is configured to: obtain the values corresponding to the variable as the first data value information from the statistics information of the first table according to the relationship between the variable and the first table, and obtain occurrence frequencies of the values corresponding to the variable as the first probability information.

12. The computer program product according to claim 9, wherein the first information obtaining unit is configured to: obtain the values corresponding to the variable as the first data value information from the statistics information of the first table according to the relationship between the variable and the first table, and obtain the relative ratios of occurrence frequencies of the values corresponding to the variable as the first probability information.

13. The computer program product according to claim 9, wherein the estimation unit comprises:
  a probability value obtaining module, configured to obtain the corresponding probability values for the possible values of the filtering result from the first probability information and the second probability information, respectively; and
  a determination module, configured to determine the filter factor according to the combination of the probability values.

14. The computer program product according to claim 13, wherein the determination module is configured to estimate the filter factor FF as:

$$FF = \sum_{j=1}^{k} Fw_j \times Ff_j,$$

where $Fw^j$ and $Ff^j$ are the corresponding probability values for the $j^{th}$ possible value of the filtering result from the first probability information and the second probability information, respectively.

15. The computer program product according to claim 13, wherein the estimating further includes taking the data values in the intersection of the first data value information and the second data value information as the possible values of the filtering result according to the first data value information and the second data value information.

16. The computer program product according to claim 9, further comprising a combination unit, configured to estimate the filter factor of each of two or more filter conditions in a query statement, and combine estimated filter factors according to a logical relation defined in the query statement in order to obtain the filter factor of the query statement.

* * * * *